United States Patent [19]

Nichols

[11] 4,157,544
[45] Jun. 5, 1979

[54] HYBRID TERMINAL ASSIST LANDING

[75] Inventor: Roy L. Nichols, Ridgecrest, Calif.

[73] Assignee: The United States of America as represented by the Secretary of the Navy, Washington, D.C.

[21] Appl. No.: 844,252

[22] Filed: Oct. 21, 1977

[51] Int. Cl.² .............................................. G01S 9/02
[52] U.S. Cl. .................................. 343/5 GC; 343/6 R
[58] Field of Search ................ 343/5 LS, 5 GC, 6 R, 343/6 ND

[56] References Cited

U.S. PATENT DOCUMENTS

| 3,169,726 | 2/1965 | Jackson | 343/6 ND X |
| 3,289,203 | 11/1966 | Gaylord | 343/6 R |
| 3,427,611 | 2/1969 | Enenstein | 343/6 R |
| 3,924,232 | 12/1975 | Burdi et al. | 343/6 R |
| 4,050,068 | 9/1977 | Berg et al. | 343/6 R |

Primary Examiner—T. H. Tubbesing
Attorney, Agent, or Firm—R. S. Sciascia; W. Thom Skeer; Kenneth G. Pritchard

[57] ABSTRACT

Control of multiple remotely piloted vehicles provided through a system called the Hybrid Terminal Assist Landing. This system, also referred to as HYTAL, is composed of two principal subsystems, an RF approach control subsystem and a precise optical landing point homing and ranging subsystem. By using a hybrid combination of RF and optical sensors, the remotely piloted vehicle, RPV or other aircraft approach control and recovery guidance system can be optimized with respect to performance complexity, size, weight and cost.

13 Claims, 11 Drawing Figures

HYBRID TERMINAL ASSIST LANDING

BACKGROUND OF THE INVENTION

1. Field of the Invention.

This invention pertains to remote control systems. More specifically it pertains to remote control systems for remotely piloted vehicles, and other fixed-wing and hovering aircraft. In even greater particularity it refers to remote control systems using a combination of control systems such as optical and radio frequency control systems.

2. Description of the Prior Art.

Remote control systems have been known for many years. Previous systems were of limited use in the area of automatic Remotely Piloted Vehicle (RPV) recovery guidance. Previous systems did not provide recovery guidance that could control multiple RPVs and, at the same time, could be operated from a wide variety of base stations. Further problems arose in that the recovery guidance systems were not small and readily integrated into existing equipment without major modification and great cost. They were further limited in that they were not capable of tracking, commanding, and precisely controlling RPV flight. This includes take-off and touch down phases, day, night, adverse weather, and high sea state conditions. The prior art also failed to provide a recovery guidance system that was equally qualified to land fixed-wing or hovering types of RPVs. It is also highly desirable that an effective system be adaptable to providing a pilot assist for helicopters and V/STOL aircraft recovery aboard the same ships.

SUMMARY OF THE INVENTION

The Hybrid Terminal Assist Landing (HYTAL) system has the capability of correcting the operational deficiencies noted and satisfying all of the above requirements. The HYTAL system is composed of two principal subsystems, an RF approach control subsystem and a precise optical landing point homing and ranging subsystem.

By using a hybrid combination of RF and optical sensors, an RPV approach control and recovery guidance system which is optimized with respect to performance, complexity, size, weight, and cost is achieved. The RF subsystem operates at a low RF frequency so that it is not degraded by rain. Only small, fixed, (non-gimballed) rugged RF antennas, which require no superstructure for mounting, are used. The system can control multiple RPVs at ranges out to 50 nautical miles or greater throughout the terminal recovery maneuver. The RF subsystem utilizes spread spectrum techniques to provide long range bearing and range approach control, as well as the data link, with fixed (non-steerable) antennas to give full hemispherical coverage by interferometer techniques. The spread spectrum technique radiates signals which have an inherent low probability of detection by an enemy intercept receiver. This also permits the system to be highly resistant to electronic counter measures.

The RF subsystem provides the site homing for the RPV. It transfers control to a precise optical terminal recovery subsystem for the final recovery. This precise optical subsystem is composed of a gimballed optical tracking and ranging sensor which is slaved to the azimuth and elevation coordinates provided by the RF subsystem until the optical subsystem acquires control for landing. The optical sensor tracks a small passive retroreflector mounted on the RPV and provides very precise close-in RPV range and bearing terminal control signals.

The present invention provides a fully automatic precise RPV recovery guidance system. Further this invention provides the ability to reliably control multiple RPVs under adverse weather and high sea state conditions. It is also an object of this invention to provide a HYTAL system applicable to both fixed-wing or hovering RPVs as well as manned VTOL, vertical takeoff and landing, aircraft. Additionally, this invention provides a tactically private data link of small size, lightweight and low cost which is applicable to ship or shore use and operable under most emergency military conditions.

DESCRIPTION OF THE PREFERRED EMBODIMENT

Figure 1:
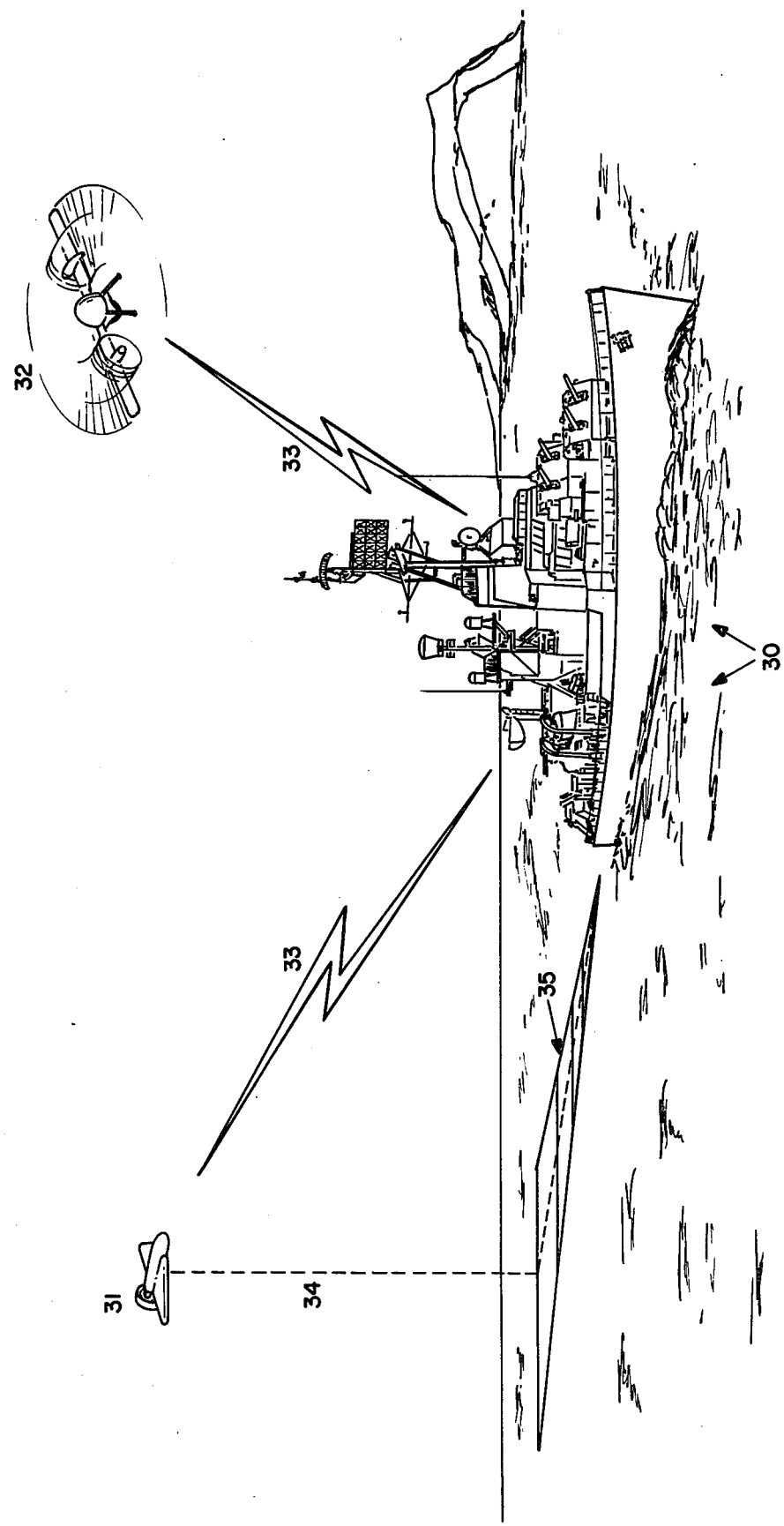
FIG. 1 is an overview of one possible environment for the present invention.

FIG. 1 is a drawing showing the type of environment the present invention was designed to serve. A base station 30, which in FIG. 1 is a ship, uses the hybrid terminal assist landing, HYTAL, system to control remotely piloted vehicles such as fixed-wing RPV 31 and hovering craft RPV 32. The communications links are presented by jagged lines 33 and for RPV 31 the altitude is represented by dashed line 34. RPV 31 is further shown over an approach path 35 which is drawn to represent the angular spread that would be used by the HYTAL system.

Figure 2:
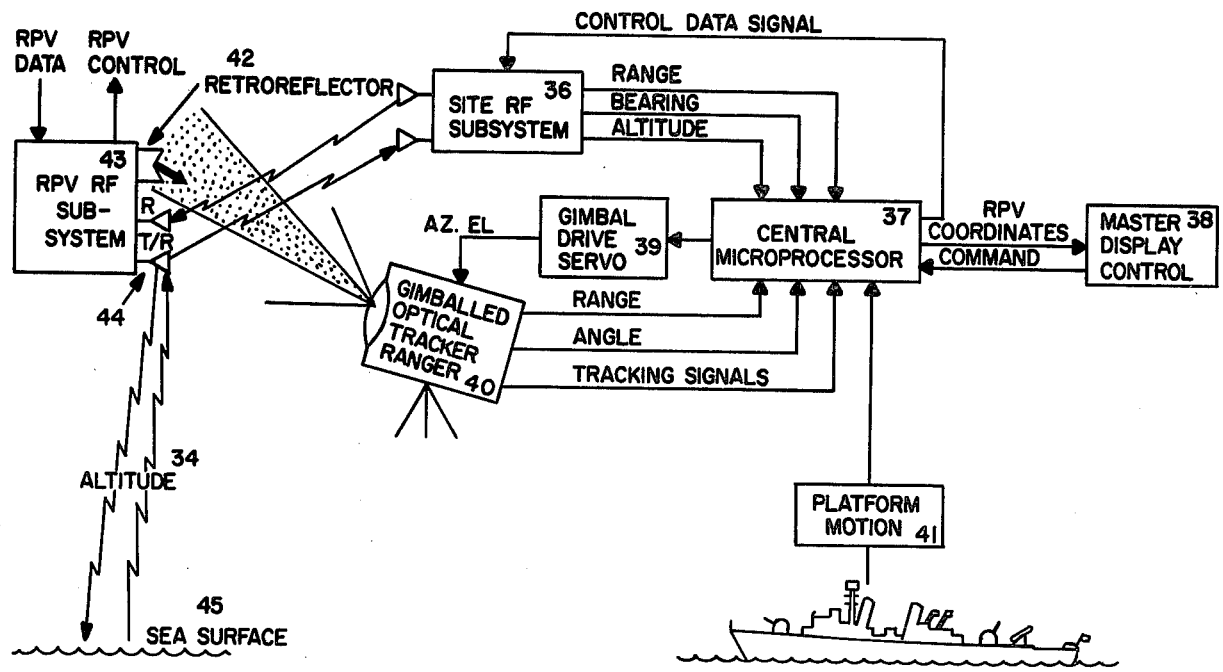
FIG. 2 is a block diagram of the present invention.

HYTAL is a hybrid RF/Optical recovery guidance system as shown in FIG. 1. FIG. 2 is a block diagram of this hybrid guidance system. The RF subsystem utilizes spread spectrum techniques to provide long range bearing and range approach control, as well as the data link to the RPV. Spread spectrum techniques are biphased modulations of an RF carrier by pseudo-noise code. This modulation technique allows operation in severe electronic counter measures environments. The nature of the RF spread spectrum provides tactically private transmission.

The illustrated hybrid guidance system starts with a site location for RF subsystem 36 which is tied to a central microprocessor 37 which feeds a master display control 38. Central Microprocessor 37 uses RF subsystem 36 information to steer a gimbal drive servo 39. Servo 39 controls the optical tracker and ranger 40. Included as an input to microprocessor 37 is a signal representative of platform motion 41 which is necessary when the base station is a ship or other movable vehicle.

Central microprocessor 37 receives feedback signals from both RF subsystem 36 and the optical tracker and ranger 40. These feedback signals permit microprocessor 37 to steer gimbal drive servo 39 so as to keep the RPV in the field of view of optical tracker and ranger 40. Microprocessor 37 also uses this feedback to show RPV location on display control 38 so that an operator can visually track the RPV's location. Master display control 38 also provides the means for sending command control signals from RF subsystem 36 after they are appropriately coded by microprocessor 37.

The optical subsystem is ship based, gimballed and slaved to the azimuth and elevation coordinates provided by the RF subsystem until it aquires RPV control. The terminal control of the RPV is transferred to the optical subsystem for the final precise terminal recovery manuver. The optical subsystem is only used to monitor RPV location. Command control signals are always sent to the RPV via the RF subsystem in the embodiment shown. The optical subsystem provides high accuracy as to RPV location but has a shorter range than the RF subsystem. Thus the optical subsystem is ideally suited to take-off and landings where accuracy is crucial. The optical subsystem employs an optical component on the RPV, a small lightweight, passive retroreflector 42. As shown, retroreflector 42 is mounted on the RF subsystem of the RPV 43.

As shown in FIG. 2, the RF antenna system 44 is composed of two separate antennas. The one labeled R is the receiving antenna for the command control signals. The other, labeled T/R, monitors the altitude 34 of the RPV from sea surface 45. It does this by emitting a signal toward the ground or sea surface and timing the arrival of the reflected pulse. The T/R antenna also transmits back to the RF subsystem 36 range, bearing and altitude data as will be discussed below. An alternate altitude measurement could be made by an onboard barometric altimeter which is not shown.

The RF subsystem uses a low RF frequency to provide high reliability RPV approach control to ranges in excess of 50 nautical miles. By using pseudo-noise code, spread spectrum RF transmission, the desired performance can be achieved with a low transmit power and inherent low detectability. It operates in a transponder mode rather than radar. A master unit is operated on the recovery ship and a slaved RF transponder is carried on the RPV. This subsystem measures the relative bearing angle to the RPV by processing the time of arrival of the return signals between pairs of antennas using interferometer techniques.

Figure 3:
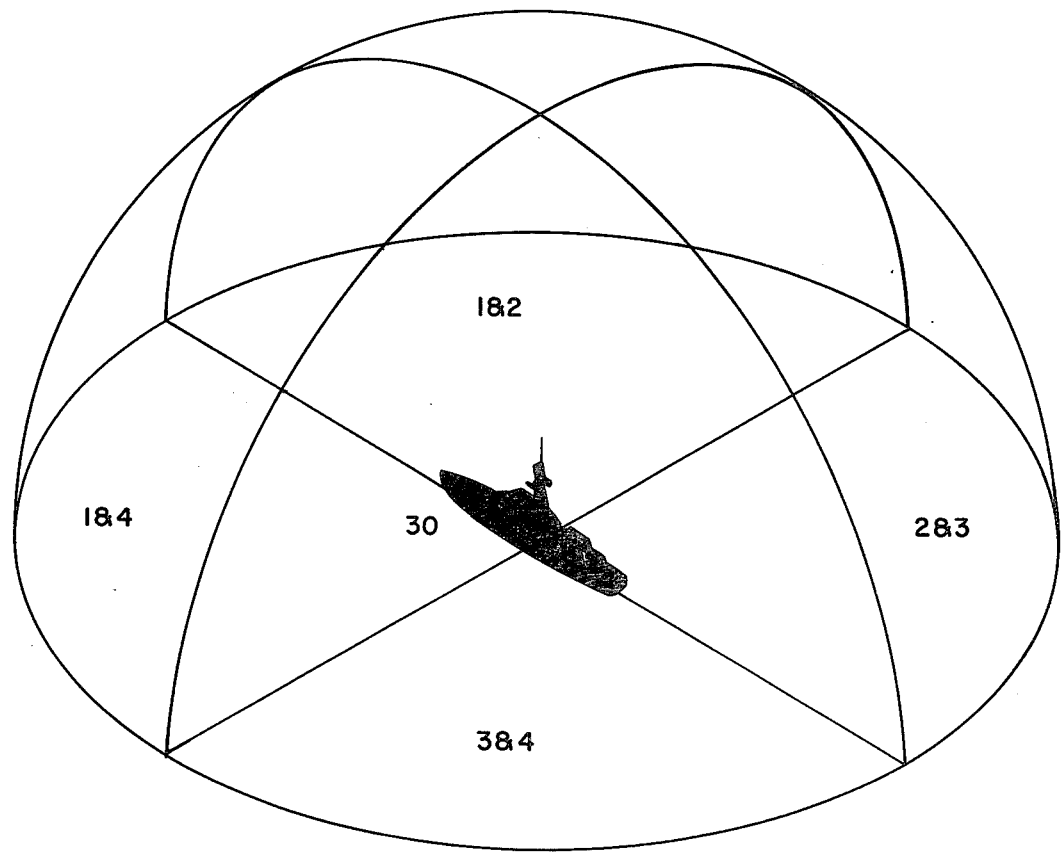
FIG. 3 is a diagram of RF antenna coverage.

FIG. 3 shows the RF antennas mounted rigidly to the deck structure of ship 30. There are four antennas, fore, aft, port and starboard. Each RF antenna provides a pattern with 180° in azimuth and 90° in elevation coverage. The antennas overlap such that each sector about the ship is covered by two antenna patterns as shown in FIG. 3. The combination of overlap provides hemispherical coverage about the ship. The antennas used are fixed, nongimballed, antennas which give full hemispheric coverage by interferometer techniques.

As shown in FIG. 3, the fore antenna is providing coverage for the two quadrants marked with the number 1. The aft antenna provides coverage for the two quadrants marked with the number 3. The starboard antenna covers the two quadrants labelled 2 and the port antenna provides coverage for the two quadrants labled 4. In any given quadrant, there is an overlap of two antennas which provide the interferometer pattern needed to accurately locate an RPV.

Figure 4:
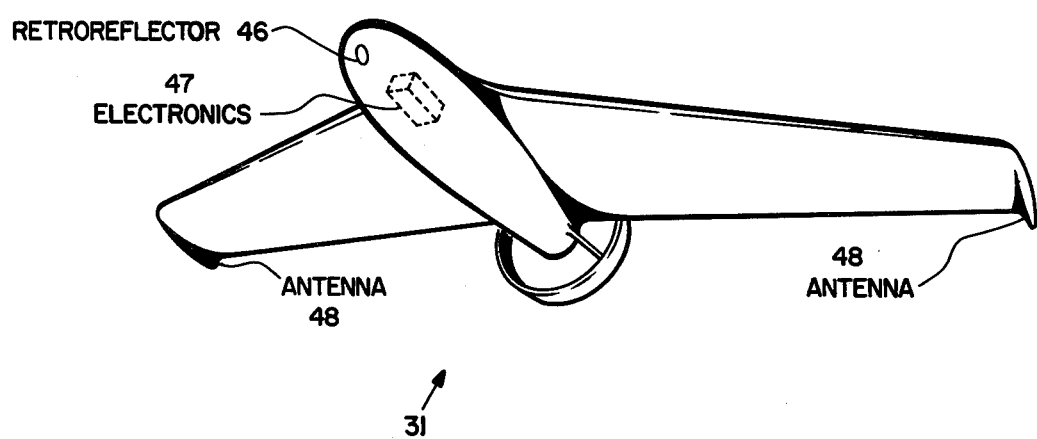
FIG. 4 is a diagram of the HYTAL equipment on an RPV.

FIG. 4 is a diagram of an RPV 31 which contains retroreflector 46, electronics packaging 47 and RF antennas 48. The antennas can be either fin antennas, as shown or they can be mounted flush with the air foil, in the conventional fashion. Electronics 47 provides the conventional circuitry necessary to determine altitude and process control information. Antennas 48 are small, lightwight and inexpensive. Retroreflector 46 is a small passive retroreflector. Electronic package 47 includes a transponder, not shown, and can be integrated into any convient location on the RPV. It requires only 0.2 cubic feet of space.

The RF subsystem of HYTAL employs full duplexed transceivers with fixed, non-gimballed antennas to obtain approach control navigational and telemetry information and provide a command data link to the RPV. Referring to FIG. 1, the ship to RPV range can be measured to within 10 feet, the azimuth angle to within 2° and the RPV altitude to within 10 feet. The operating frequency can be set to any specified frequency between 500 MHz and 3 GHz. The operational range is dependent on line of sight between ship and RPV. For example, if the RPV is crusing at 1000 feet altitude, the RF subsystem will have the capability of operating out to ranges of 50 nautical miles with a 30 dB signal-to-noise ratio. Longer range performance is available if the RPV is maintained at a higher altitude.

Figure 5:
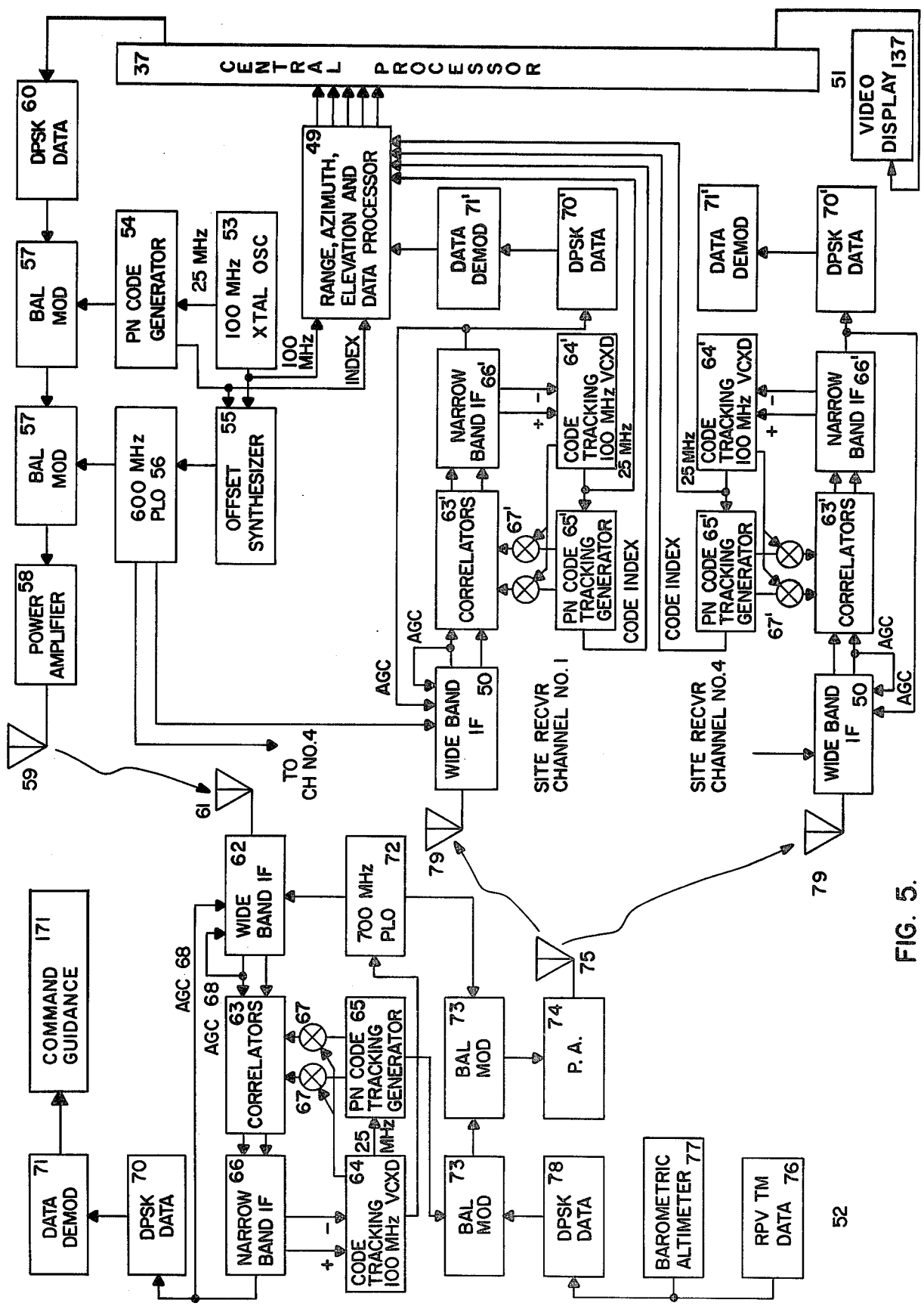
FIG. 5 is a block diagram of the RF subsystem.

A general block diagram of the RF subsystem is shown in FIG. 5. Typical design parameters are shown in this figure to better describe the operating concept. This block diagram shows only two ship-based or base station receiver channels and displays the RF subsystem technique for one quadrant of the 360° azimuthal coverage about the ship. The complete RF subsystem has two additional receiver channels, not shown in FIG. 5.

In FIG. 5, the RF ship-based unit is shown on the right of the block diagram and is labelled generally by the number 51. This is the control section of the RF subsystem. The RPV remote unit is on the left, shown generally by the number 52. This is the response section of the RF subsystem. The site unit 51 has a 100 MHz crystal oscillator 53 in the transmitter to provide the master signal through a divide-by-four circuit which generates the code clock frequency for the 25 MHz pseudo-noise code generator 54. The output of crystal oscillator 53 provides a reference signal, via a frequency offset synthesizer 55, for the phase locked oscillator, PLO, 56. Phase locked oscillator 56 generates the transmit RF carrier of 600 MHz and additionally the first local oscillator for the site receiver channels.

Balanced modulation of the RF carrier with the pseudo-noise code produces a spread spectrum, sinx/x waveform through balance modulators 57 and is subsequently power amplified by a conventional power amplifier 58 and broadcast from transmit antenna 59. Differential phase shift keyed, DPSK, data 60 is modulo-2 added to the pseudo-noise code by conventional techniques. The DPSK format is used to relay the data 60. The pseudo-noise spread spectrum signals are received by the remote or RPV transceiver antenna 61 and are heterodyned by the 700 MHz PLO 72 of the RPV receiver. The resultant 100 MHz frequency difference from the transmitting frequency 600 MHz is amplified in a wideband intermediate frequency, IF, stage 62. The broadband IF signal output of stage 62 is then correlated in two parallel channels 63 with similar up-converted broadband signals 67 generated from replicas of the transmit pseudo-noise code.

The remote unit's 100 MHz crystal oscillator 64 provides the master signal through a divide by four circuit which generates the code clock frequency for the 25 MHz pseudo-noise code generator 65. The relative displacement between the two internally generated codes is one bit. Consequently, as correlation is achieved by the convolution of the transmit and receive codes, the broadband IF signal collapses into a narrow information bandwidth and is amplified in the narrow band IF amplifier 66. Narrow band IF amplifier 66 outputs signals which are subtracted to produce an S curve discriminator error voltage which, in turn, drives a voltage controlled oscillator enabling the subsystem to acquire and track the incoming bit stream. Other spurious received signals such as electronic counter measures and out of range multipath signals which are not bit for bit synchronized in the correlators, are broadbanded. Such signals might be found by reflection off of a water surface. Only a small fraction of this uncorrelated signal enters the narrow band IF 66. For a 1024 bit code length, 30 dB of jamming margin can be realized for a continuous wave, CW, signal and 60 dB rejection for uncorrelated broadband signals. Two automatic gain control loops, AGC, 68 are used in the receiver to give a wide dynamic range.

The signals from the two narrow band IF amplifiers 66, in addition to providing the code tracking error signal, provide a double side band suppressed carrier signal from which the DPSK data 70 is extracted for RPV command control and other data transmission requirements. The signal in the narrow band IF amplifier 66 is the result of the off-set frequency injected at the site unit. The signal from the DPSK data 70 is sent into a data demodualtor 71 which decodes the signal. The decoded signal is then executed by the RPV through the command guidance 171. Command guidance 171 is any of the well known means for movement of aircraft control surfaces.

The down link transmitter of the RPV unit employs a 700 MHz PLO 72. A different down link RF transmitter frequency is used to provide good isolation between the up and down links during continuous operation. The down link RF is balance modulated in circuit element 73 by the pseudo-noise code. This produces a sinx/x wave form which is subsequently power amplified by amplifier 74 and transmitted from the RPV unit antenna 75. The pseudo-noise code is a replica of the transmit code, but is time delayed by the one way propagation time between the site and the RPV. RPV telemetry data 76 and RF or barometric altimeter data 77 can be formated into DPSK form 78 and modulo-2 added to the pseudo-noise code prior to phase modulation at the RF frequency.

After the RPV unit has locked up to the pseudo-noise coded spread spectrum signal, it returns the pseudo-noise coded RF signal back to the site unit 51. Signal reception, acquistion, and code lock-up at the site station is achieved in exactly the same manner as in the up-link. Pseudo-noise signals from the RPV unit are received by the receiver antennas 79 and are heterodyned by 600 MHz PLO 56. The resultant 100 MHz difference frequency is amplified in wideband IF stage 50, as discussed previously. This broadband IF signal is correlated in two parallel channels 63' with similar converted broadband signals 67' from the transmit pseudo-noise code. The divide-by-four 100 MHz crystal oscillators 64' generate the code clock frequency for the 25 MHz pseudo-noise code generator 65'. The wideband IF signal is correlated with the pseudo-noise code and amplified in the narrow band IF 66'. The narrow band IF signals are subtracted to produce another S curve discriminator for code lock-up and strip off the return data transmissions. Once the site unit has locked up to the return pseudo-noise coded spread spectrum signal, full duplex operation is achieved and the range and bearing information is automatically determined in real time. The information is determined through DPSK data 70', data demodulator 71' and fed into data processor 49. All of the processing is referred back to central processor 37 which provides a video display 137. In turn, central processor 37 calculates the next command signal and inputs it to DPSK data 60 which starts a repeat cycle.

The RF subsystem processes the transponded signals to determine the range and azimuth angle to the RPV and demodulates the superimposed altitude information from the RPV to determine the elevation angle. Assuming the site unit is locked up and tracking the return from the RPV unit, the time lag $\tau$ between the site receiver pseudo-noise code generator and the site transmitter pseudo-noise code generator is proportional to the range between the RPV and the ship. Since $\tau$ is the two way propagation delay, the range to the RPV is easily determined. The range is given by the equation $R = \tau X c/2$ where R is the range of the vehicle, $\tau$ is the time arrival difference, and c is the propagation velocity, which in this case is the velocity of light. As code tracking to within ¼ bit of the code can be realized, the range resolution is limited by the code clock frequency. With a code clock frequency of 25 MHz, the RF subsystem resolution is 10 feet.

Range ambiguities, which are a function of the code clock frequency and the code length, occur at ranges determined by the equation $R = Nc/2f$ where N = the number of bits in the code, $f_c$ = code clock frequency and R and c are as previously defined. This ambiguity can be resolved by measuring the time of arrival of a range marker signal modulated on the data. The ambigous range can be increased at the expense of increasing the code length and/or decreasing the code clock frequency.

Figure 6:
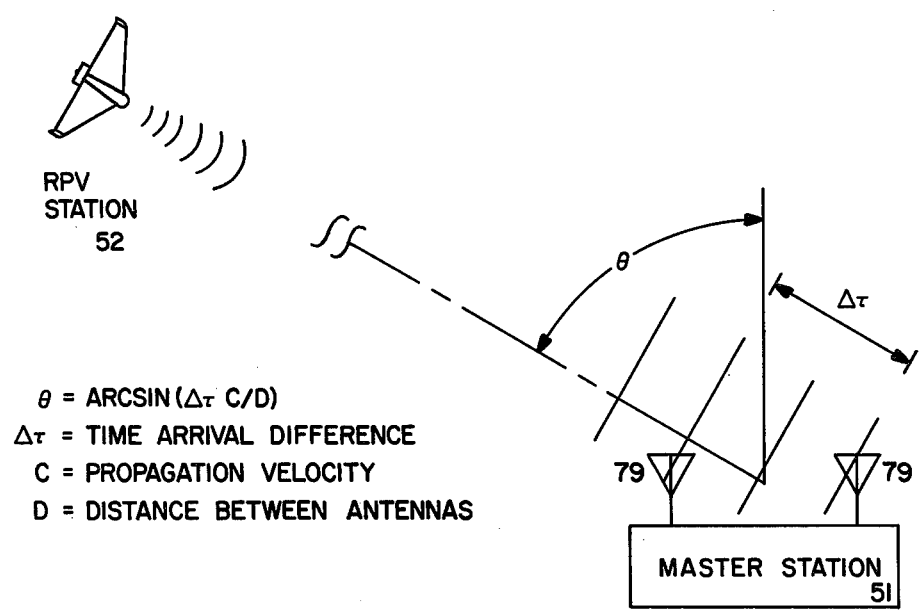
FIG. 6 is a diagram of how two antennas provide interferometric tracking.

Azimuth measurements to provide the full 360° coverage will require four receiver channels with spatial interpolation as shown in FIG. 3. The quadrant location will be determined by processing the time of arrival of signals from the RPV by using interferometer techniques as depicted in FIG. 6. The difference in time of arrival is measured by phase comparison of the code clock frequency of the two site receiver channels covering azimuthal areas which overlap.

Information gathered by the RF subsystem such as range, azimuth, altitude as well as other down link telemetry data, are interfaced into the HYTAL central processor 37 to determine the bearing and operational status of each RPV relative to the ship. Additionally, during the terminal phase of flight the azimuth and elevation angles to the RPV are computed, processed and used to point the gimballed head of the terminal phase optical subsystem until optical tracking signals are relied on.

FIG. 6 shows the relationship between the master station 51 as shown in FIG. 5 using two receiver antennas 79 and RPV station 52 as previously shown in FIG.

5. The angular difference results in a time arrival difference Δt as shown in FIG. 6. The angle θ is determined by the equation noted in FIG. 6. The location of the RPV can be determined by combining this angle with the range information provided by the return signal delay from RPV station 52.

Figure 7:
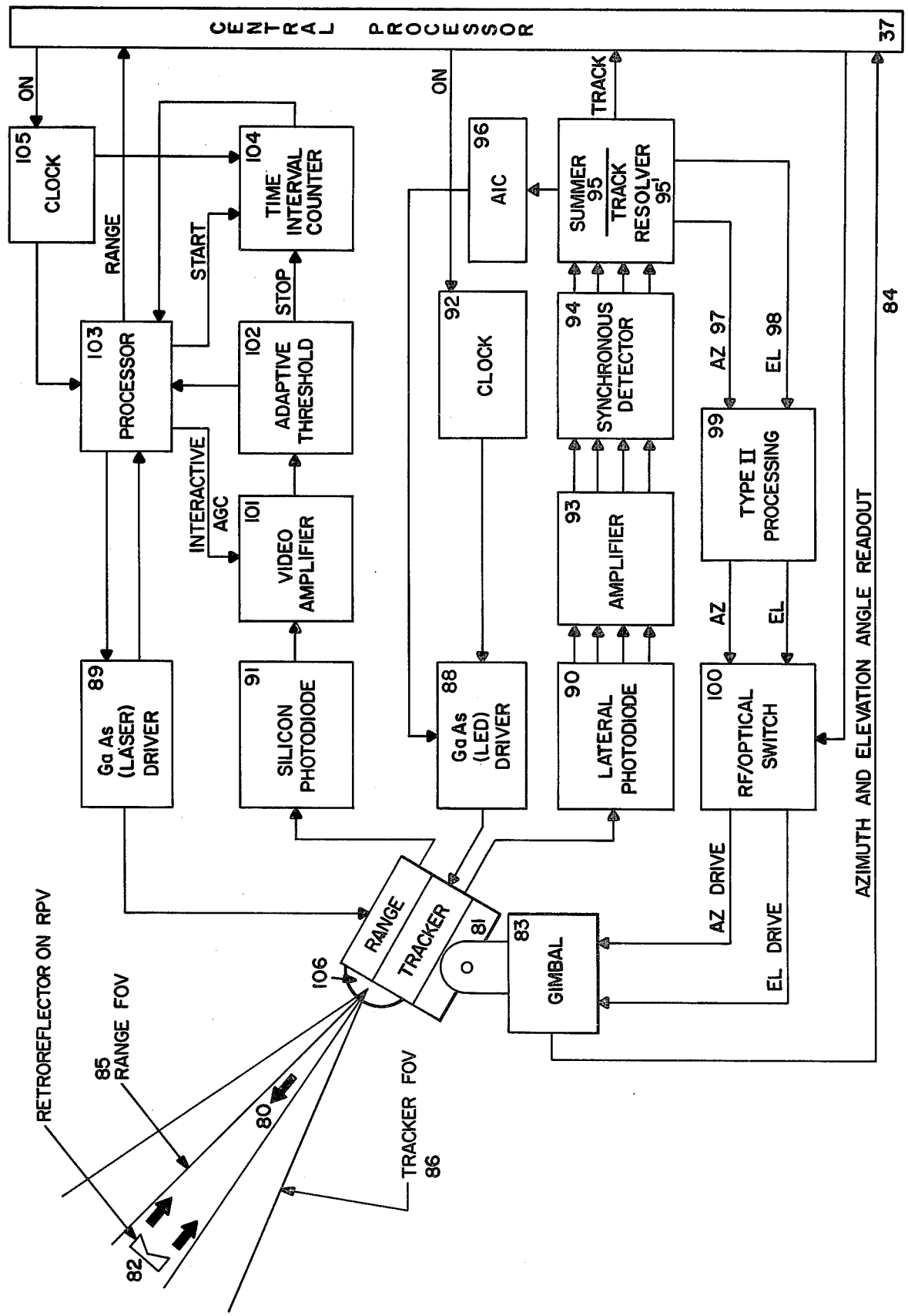
FIG. 7 is a block diagram of the optical subsystem.

FIG. 7 is a block diagram of the HYTAL optical subsystem. The optical subsystem has a control section 84 at the base station and a response section using control electronics 47 shown in FIG. 4 and retroreflector 82 both of which are in the RPV. The optical subsystem consists of a composite active optical tracker and ranger 81 which points at the RPV under control. The ship based optical subsystem consists of a gimballed assembly 83 which holds the ranger and tracker unit 81 as shown in FIG. 7. The optical sensor is small and can be readily mounted at a convenient spot near the RPV recovery area on the ship. Since it is gimballed and tracks the RPV position in azimuth, elevation and range, it can readily direct the RPV to a given position on or near the deck from an optical sensor location which is remote from the landing spot.

The optical subsystem transmits radiation 80 towards the RPV and tracks and ranges to the reflected return. Retroreflector 82 is an optical corner cube reflector which reflects essentially all the radiant energy that it intercepts back to the point from which it received it. Corner cube reflectors typically have a field-of-view of 40°. An array of retroreflectors is used to cover as broad a reflection return angle as required. If a hemispherical array of retroreflectors is used, the orientation of the RPV is not critical to acquisition by the optical tracker and ranger 81. Retroreflector 82 also serves as a high gain, point source for tracking the RPV. The tracker unit 81 provides the angular direction to the RPV after optical acquisition. The ranger unit 81 measures the range to the RPV. The optical gimbals 83 are limited to prevent viewing the ships's superstructure.

In the HYTAL implementation, the gimballed optical subsystem is directed to look for the RPV, using the azimuth and elevation coordinates from the RF subsystem. The optical tracker 81 acquires the RPV retroreflected signal. The HYTAL central processor 37 then progressivly closes the control loop between the RF slaved servo drive and the higher accuracy optical tracker signal 80. When the range is within predetermined parameters that make the optical tracker preferable, central microprocessor 37 will send optical signals for ranging and tracking. The RPV control is transferred to the optical subsystem in this manner. Another embodiment of this invention can have all command control signals sent by the optical signals. A matched optical receiver could be added to the RPV to receive the optical signal. The transmitted optical signals can be coded to transfer the control data. Electronic package 47 in FIG. 4 would be modified to include the appropriate decoding means. If weight and space permit, this alternate embodiment of dual command links between the base station and RPVs provides a backup control in case either subsystem failed.

The optical tracker 81 is driven by the gimballed mount 83 so that the retroreflector 82 on the RPV is maintained in the center of the tracker's field of view (FOV) 86. Also, since the active optical ranger 81 field of view 85 is boresighted to the center of the tracker's FOV 86, the ranger is thereby directed at the rectroreflector 82 and measures range to the RPV by active optical means.

Figure 8:
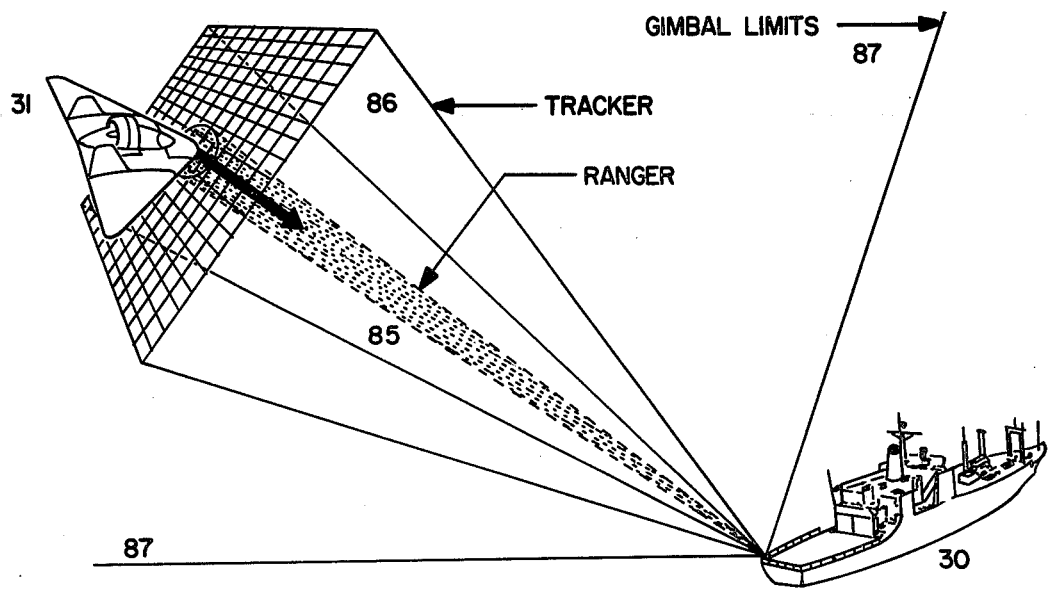
FIG. 8 is the field-of-view for the optical subsystem.

FIG. 8 shows the sensory FOV for the optical subsystem. The optical tracker FOV 86 is set to be larger than the angular errors of the RF approach control subsystem, typically 5°. Ship 30 and RPV 31 are shown with the RPV 31 centered in the optical tracker. The optical ranger FOV 85 is smaller and is boresighted to the center of the tracker's FOV 86. The ranger FOV 85 is shown centered in the tracker FOV 86. The gimbal limits 87 are chosen to prevent the optical device from viewing the ship's superstructure or viewing below the water line. In test models, the ranger has a 3° FOV 85 centered in the 5° FOV 86 of the tracker.

FIG. 7 shows the basic design approach for the HYTAL optical subsystem. The composite optical block diagram shows the optical tracker and ranger 81 supporting circuit. The optical tracker and ranger 81 are mounted on gimbal 83 which is initially directed at the approaching RPV by the azimuth and elevation coordinates provided by the HYTAL RF subsystems via central processor 37.

Both the optical tracker and ranger 81 operate as active optical sensors. The tracker has a broad transmitter beam using a Gallium Aresnide, GaAs, light emitting diode 88, LED, as the source. The ranger operates on the short pulse radiation from a GaAs injection laser 89. The tracker uses a silicon lateral photodiode detector 90 which senses the position of the return image in the plane of the detector. The ranger uses a conventional high speed silicon detector 91 to detect short pulse video return.

The energy from GaAs LED 88 is square wave modulated by clock driver 92 and directed through optics 106 to produce a beam width of 5°. This beam illuminates the retroreflector 82 on the RPV 31 which in turn reflects a small portion of the radiated energy back to the optical tracker receiver optics 106. This received energy is imaged onto the tracker's lateral photodiode surface 90. The tracker lateral photodiode 90 has four outputs which are proportional to the intensity of the image distribution and location on the detectors surface. These outputs are orthogonal and correspond to the azimuth and elevation coordinates of the image error position. The signals from the detector are passed through amplifier 93, filtered and fed into four synchronous detector circuits 94. Synchronous detectors 94 selectively enhance the return signals which are synchronized with the GaAs LED 88 modulation. At the output of the synchronous detector 94, the azimuth and elevation error signals are processed through a summing circuit 95. When the sum signal amplitude exceeds a predetermined threshold, a signal is generated through the central processor 37 to switch from RF to optical gimbal control. The sum signal is used to generate an automatic intensity control 96, AIC, for the GaAs LED 88 to keep the optical tracker receiver out of saturation during the terminal maneuver. Summing circuit 95 also functions as track resolver 95'. The tracking error signals are resolved into the azimuth and elevation signals 97 and 98 which are then passed through type II processing 99 and are used to redirect the optical subsystem's gimbal mount 83 to center the retroreflected return in FOV 85. Type II processing is used to give positive rate tracking. The optical aimpoint for azimuth and elevation angles is obtained from the gimbal drive mount 83 and processed for display and utilization by central processor 37. Central processor 37 triggers the RF/optical switch 100 in conjunction with the signals provided through track resolver 95' as noted previously.

The ranger portion of the optical subsystem shown in FIG. 7 determines range precisely by measuring the round trip time lapse between exit of the transmit GaAs laser pulse and the received return pulse. A GaAs injection laser diode 89 is pulsed at a fixed pulse repetition frequency and produces short nanosecond infrared pulses. This short pulse radiation is colliminated into a narrow beam which is boresighted to the tracker beam. With tracker 81 locked-on, retroreflector 82 returns a portion of the short pulse radiation to the ranger 81 receiver optics 106. This signal is focussed onto a high speed silicon photodiode 91, amplified and filtered in video amplifier stages 101. The amplified return pulse is fed into an adaptive threshold circuit 102 which normalizes the pulse such that a threshold can be set at half amplitude.

The key to the high range resolution of ranger 81 is a microprocessor unit 103 which controls and digitally processes the ranging signals. The precise time of generation of the short GaAs laser pulse is sensed at the leads of laser diode 89, processed, and used to start the time interval counter 104. The video return pulse from the adaptive threshold is used to stop the time interval counter 104. By using leading and trailing edge compensation together with microprocessing, very precise range measurements can be made on a pulse to pulse basis. Central processor 37 triggers clock 105 which provides the appropriate clocking pulses to the processor 103 and counter 104. Better than one foot range resolution is achievable in this manner. Microprocessor 103 generates the range to the RPV from the signal from the time interval counter 104 and provides the range readout for display and RPV recovery guidance through central processor 37.

The optical subsystem is small and lightweight. It is constructed of all solid state electronics and requires no cooling for operation over military specifications. The optical sensor can be compared in size in its ultimate form to a guided missile seeker head. A ship qualified portable gimballed mount 83 is needed for the optical subsystem. This type of hardware is readily available. This system is very portable and can be readily mounted at any convenient spot on the ship without interfering with existing equipment. A further advantage of the system shown is that it requires little power to operate. It can be readily operated from an interruptable power supply without any short term failure. Also, it can be made to be self-calibrating and aligning by using station based retroreflectors not shown. Since it operates effectively at low radiant power, it does not present any laser eye hazard to the operators during use.

The choice of GaAs laser 89 for optical subsystem tracker ranger 81 was influenced greatly by the small sized, low power, advanced state of the art of the solid state laser and the lack of laser eye hazard. GaAs lasers are small. They are on the order of the size of a transistor. They are approximately 10% efficient, so not much input power is required. Active optical GaAs sensor systems can be readily configured in missile size hardware packages which need military environmental constraints. This type of optical system requires no detector or source cooling which further simplifies the design and reduces the cost.

Other alternate laser sources, such as the YAG laser and the waveguide $CO_2$ laser are possible. Their use has been ruled out in the preferred embodiment for the following reasons. The YAG laser was considered a poor choice because of its low pulse repetition frequency and resultant laser eye hazard. The $CO_2$ laser was considered to be a better choice for extended range performance in low visibility conditions and less susceptible to laser eye hazard than GaAs at equivalent output power levels. The technology development for the $CO_2$ shows promise. However, the $CO_2$ laser requires cyrogenic cooled detectors. This added restriction makes it less attractive for hybrid implementation. Of course, such engineering trade-off's are subject to continual reevaluation as the state-of-the-art undergoes development. Therefore, such limitations are considered only exemplarly of those made by persons versed in the instrumentation and electronics arts.

Figure 9:
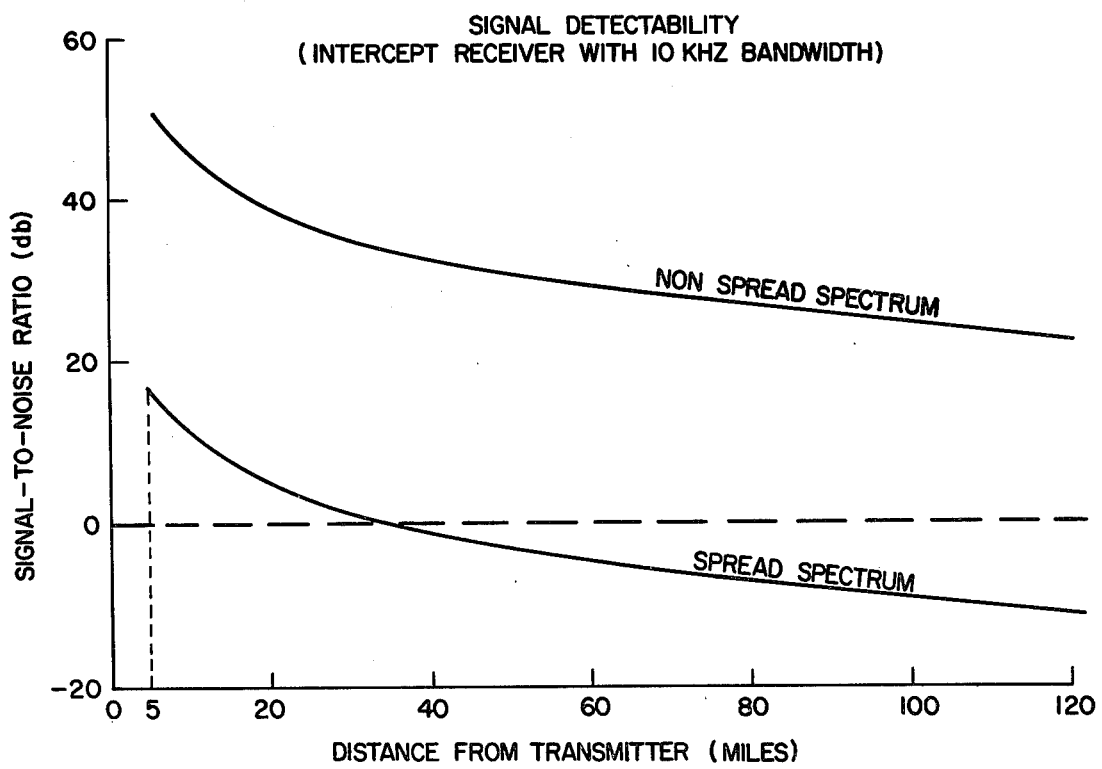
FIG. 9 is a graph comparing the difference in detectability between spread spectrum and non-spread spectrum transmission.

The RF approach control subsystem uses a pseudorandom binary sequence to biphase modulate a continuous wave carrier. This yields excellent electronic counter measures performance and provides a signal that is hard to detect with remote intercept receiver equipment. An example of the low detectability of this RF radiation is shown in FIG. 9. In this figure, the RF signal detectability to noise ratio is plotted versus the distance from a ten watt transmitter. Assuming that a signal-to-noise ratio of 20 decibels is required for detection by an enemy intercept receiver, it becomes very difficult to detect the spread spectrum transmission beyond 5 miles from the transmitter. Whereas, the nonspread spectrum, conventional narrow band RF transmission of the same transmit power, 10 watts, is easily detected out to at least 120 miles from the transmitter. It is this characteristic of spread spectrum transmission which greatly improves the RF subsystem ability to operate under military conditions in hostile environments without detection, but still allowing operation out to 50 nautical miles with a code enhanced transponder receiver.

Figure 10:
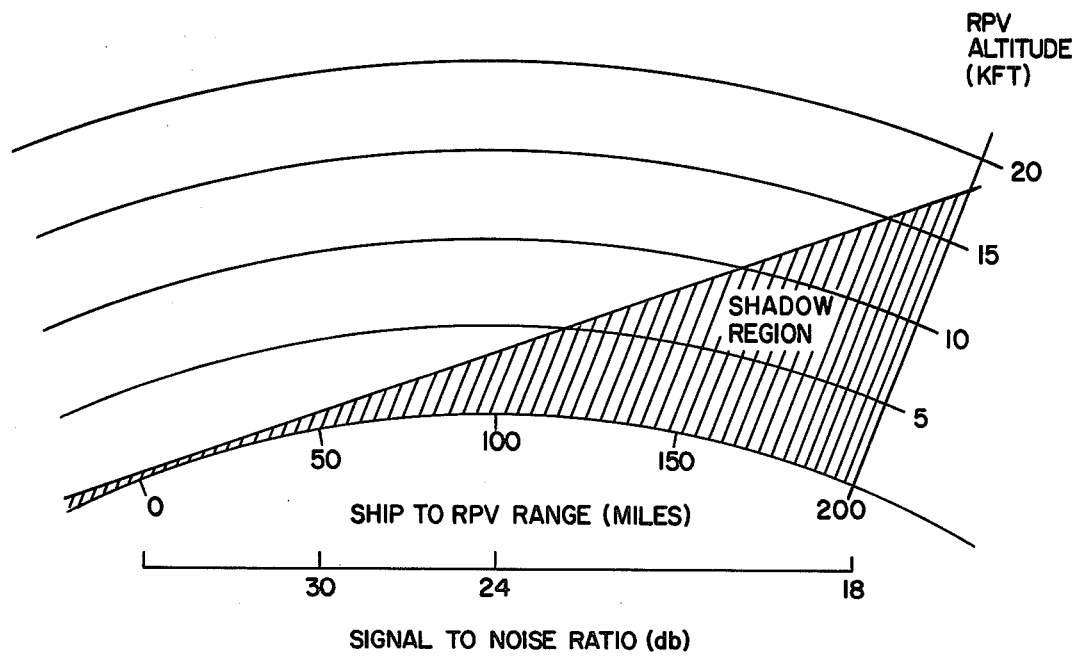
FIG. 10 is a graph of the minimum RPV altitude for line-of-sight operation as a function of ship-to-RPV range.

The operational range of the RF subsystem is line-of-sight. At these operating frequencies, the system is restricted in its operational envelope due to the curvature of the earth. FIG. 10 illustrates this principle by plotting the minimum RPV altitude for line-of-sight operation as a function of ship-to-RPV range. The RPV has to operate above the shaded area or else the earth will block communication. In effect, the RPV is in the shadow of the earth. Also shown in FIG. 10 is the expected signal-to-noise-ratio of the decoded signal for RPVs operating in the line-of-sight region. As an example, for an RPV maintaining an approach altitutde of 1000 feet, the HYTAL RF subsystem will be able to operate at a ship-to-RPV range of 50 nautical miles with a signal to noise ratio of 30dB. Longer range performance is realizable if the RPV is maintained at higher altitudes or if a relay station is used.

Figure 11:
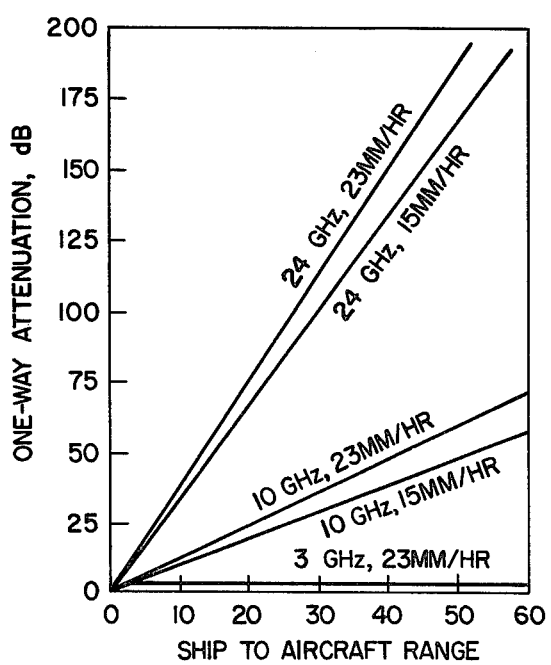
FIG. 11 is a graph of rain attenuation as a function of ship-to-aircraft range.

The RF subsystem operates at a RF frequency chosen to achieve immunity from rain interference. This frequency should be less than 3GHz. FIG. 11 demonstrates one of the principal reasons for choosing the RF operating frequency less than 3GHz. This reason is the effect of weather on electromagnetic radiation. FIG. 11 shows the expected one-way attenuation due to rain as a function of ship-to-RPV range for three different operating frequencies and two rainfall rates. As can be readily seen from FIG. 11, the signal attenuation quickly becomes unacceptable over longer ranges at higher RF operating microwave frequencies. Below 3GHz, however, the attenuation is insignificant even for long ranges and heavy rainfall rates. Since the HYTAL RF subsystem is not required to be highly accurate, it is not necessary to use ultra high microwave frequencies. The operation frequency was therefore chosen to be in the 500MHz to 3GHz band to take advantage of the low signal attenuation due to rain at these frequencies. Frequencies outside of this range can be used where weather factors are minimal or overwhelmed by other considerations.

What is claimed is:

1. A hybrid terminal assist landing, HYTAL, system for fixed-wing and hovering aircraft from a base station comprising:
   a radio frequency, RF, subsystem for command control of said aircraft from said base station; and
   an optical control subsystem operationally slaved to said RF subsystem unless predetermined conditions occur upon which occurance said optical control subsystem takes over command control of said aircraft from said base station.

2. A HYTAL system as defined in claim 1 where the RF subsystem comprises:
   means for transmitting RF signals from said base station;
   means for controlling said RF signals connected to said means for transmitting so that any desired command signal will be characterized as a predetermined RF signal;
   means for receiving said predetermined RF signals on said aircraft;
   means for data demodulating said received RF signals on said aircraft connected to said means for receiving so as to decode said desired command signal; and
   command guidance means connected to said data demodulating means for executing said decoded command signal.

3. A HYTAL system as defined in claim 2 where said means for controlling comprises:
   means for monitoring movement of said aircraft as it executes said command signals connected to said transmitting means;
   electronics for pseudonoise coding said RF signals connected to said transmitting means;
   means for central processing connected to said movement monitoring means and to said coding electronics such that the response of said aircraft to said coded RF signals is used for determining further command signals; and
   a video display console connected to said monitoring means for producing a video representation of the response of said aircraft to said command signals.

4. A HYTAL system as described in claim 3 where said movement monitoring means comprises:
   means for emitting a predetermined signal from said aircraft upon receipt of said received command signals on said aircraft, said emitting means connected to said RF receiving means on said aircraft, and
   a plurality of receiving antennas at said base station positioned to provide overlapping coverage of airspace in the vicinity of said base station such that any aircraft in said vicinity is monitored by interferometric techniques.

5. A HYTAL system as described in claim 1 where said optical control subsystem further comprises;
   a gimballed sensor with a field of view for tracking and ranging from said base station which is slaved to the azimuth and elevation coordinates provided by said RF subsystem while said RF subsystem is being relied on for primary control of said aircraft;
   control electronics connected to said gimballed sensor for driving said sensor so that it always has said aircraft in its field of view;
   a retroreflector mounted on said aircraft for reflecting some of said light from said sensor back to said sensor;
   an optical tracker connected to both said gimballed sensor and said control electronics for determining the bearing to said aircraft from said base station; and
   an optical ranger connected to both said gimballed sensor and said control electronics for determining the range to said aircraft from said base station.

6. A HYTAL system as described in claim 5 further comprising an optical emitting system of laser light for use in tracking and ranging.

7. A HYTAL system as described in claim 6 where said laser system comprises:
   a broad beam light emitting diode for tracking which is attached to said control electronics; and
   a short pulse injection laser attached to said control electronics for ranging.

8. A HYTAL system as described in claim 7 where said light emitting diode is a gallium aresnide light emitting diode.

9. A HYTAL system as described in claim 7 where said injector laser is a gallium aresnide injector laser.

10. A HYTAL system for fixed wing and hovering aircraft from a base station comprising:
    a plurality of antennas at said base station for transmitting and receiving RF signals positioned to provide overlapping coverage of airspace in the vicinity of the base station such that any aircraft in said vicinity is monitored by interferometer techniques;
    means for controlling said RF signals connected to said antennas so that any desired command signal will be characterized as a predetermined RF signal;
    electronics for pseudonoise coding said predetermined RF command signals prior to transmission of said RF command signals from said antennas connected to said control means;
    means on said aircraft for receiving said command control RF signals sent from said base station;
    means for utilizing said command control RF signals from said base station attached to said means for receiving so that said command signals are converted into flight movement of said aircraft;
    means for central processing of said aircraft movement connected to said coding electronics, said RF signal controlling means and said RF receiving antennas such that the response of said aircraft to said coded RF signals is used for determining further command signals; and
    an optical control subsystem connected to and operated by said central processing means so as to override said RF command signals under predetermined conditions and provide optical command control of said aircraft.

11. A HYTAL system as described in claim 10 where the number of antennas is four and they are mounted around said base station so as to provide an antenna pattern of 180° in azimuth and 90° in elevation coverage for each antenna and overlap such that any area about the base station is covered by two antenna patterns, thereby giving a full hemispherical coverage about the base station using interferometric techniques.

12. A HYTAL system as described in claim 11 where said base station is a ship.

13. A HYTAL system as described in claim 10 where said RF signal has a frequency of less than 3 GHz to minimize the effect of weather on said RF signals.

* * * * *